United States Patent
Ghosh et al.

(10) Patent No.: US 6,549,211 B1
(45) Date of Patent: Apr. 15, 2003

(54) SYSTEM AND METHOD FOR INCREASING THE EFFICIENCY AND RELIABILITY OF THE STORAGE OF SEQUENTIAL DATA

(75) Inventors: Indraneel Ghosh, Sunnyvale, CA (US); Aditva Sreerivas, El Dorado Hills, CA (US); Srinivasu Pappula, Citrus Heights, CA (US); Sam Jensen, Fair Oaks, CA (US); Eric Samson, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/474,430

(22) Filed: Dec. 29, 1999

(51) Int. Cl.[7] .............................................. G09G 5/37
(52) U.S. Cl. ...................... 345/561; 345/543; 345/629
(58) Field of Search .................................. 345/502, 629, 345/634–636, 638, 561, 530, 531, 543; 711/154, 155, 100; 710/1, 22, 33, 52

(56) References Cited

U.S. PATENT DOCUMENTS

| | | | |
|---|---|---|---|
| 4,347,567 A | 8/1982 | DeTar et al. ................. 364/200 |
| 4,805,098 A | 2/1989 | Mills, Jr. et al. ........... 364/900 |
| 5,016,160 A | 5/1991 | Lambeth et al. ............. 364/200 |
| 5,459,842 A | 10/1995 | Begun et al. ................ 395/250 |
| 5,517,612 A | * 5/1996 | Dwin et al. ................. 345/502 |
| 5,701,503 A | 12/1997 | Singh et al. ................ 395/800 |
| 5,875,313 A | 2/1999 | Sescila et al. .............. 395/309 |

* cited by examiner

Primary Examiner—Kee M. Tung
(74) Attorney, Agent, or Firm—Blakely, Sokoloff, Taylor & Zafman LLP (57) ABSTRACT

A method, apparatus and system for storing data wherein pieces of data are selectively combined at times when a storage device is not able to accept requests to store data for a duration sufficient that multiple additional pieces of data have been received since the last request to store data was made and at least two of those pieces of data are able to be combined into a piece of data that is better configured for storage.

27 Claims, 7 Drawing Sheets

SYSTEM AND METHOD FOR INCREASING THE EFFICIENCY AND RELIABILITY OF THE STORAGE OF SEQUENTIAL DATA

FIELD OF THE INVENTION

The present invention is related to a system and method for minimizing the chance of losing sequential data during the process of storage.

ART BACKGROUND

A common function of computer systems is the storage of sequential data received in unpredictable quantities and at unpredictable times. Such data may include changes in values relayed from sensors monitoring an industrial process, audio data relayed in packets from across a network, or text data ancillary to a continuous stream of video data where the ancillary data is relayed during blanking intervals between lines, fields or frames.

Where such sequential data will be received at a very high rate, it is typically received or 'captured' using hardware that includes small, high-speed buffers for temporary storage of the data before it is to be written to or 'stored' in a larger storage device. For the sake of economy, this larger storage device is usually either dynamic RAM or a disk drive, or other storage devices that can impose greater latencies in time to store data than the buffers within the capture hardware, regardless of the quantity or other characteristics of the data.

Such storage devices also often impose additional latencies that are the result of the organization of the storage locations within the storage device. Storage locations within RAM storage devices are typically organized into arrays (called pages) of rows and columns of memory cells. The act of storing a block of data that involves storage locations within more than one row or page typically incurs a greater latency than storing the same size block of data such that only the storage locations within one row or page is involved. Storage locations within disk storage devices are typically dispersed among multiple storage surfaces, each surface being organized into tracks and sectors within tracks. The act of storing a block of data that involves storage locations of more than one sector, track or storage surface typically incurs a greater latency than storing the same size block of data such that only the storage locations of one storage surface, track or sector is involved.

As a result of these latencies, a common problem is the inability of the storage device to store all of such sequential data received within a given period of time. Such situations can occur if the storage device is also being used to store much more than just the sequential data, alone, or if there are frequent recurring accesses to the storage device by devices in the computer system other than the capture hardware. In such situations, the storage device may simply not be available for access by the capture hardware to store all of the sequential data received within a given period. However, such storage problems can also occur if the sequential data is written by the capture hardware to the storage device in too many smaller storage operations. The latencies inherent in any storage operation, regardless of the quantity of data stored, may accumulate to the point that there is insufficient time for the storage device to store all of the sequential data received within a given period.

There are prior solutions that involve combining smaller pieces of sequential data into larger pieces so as to reduce the number of individual storage operations. Such prior art solutions have typically involved the use of counters, timing intervals, or the repeated occurrence of a predetermined event to control the combining of sequential data, as well as when to perform storage operations. However, these approaches do not take into account the ability of a storage device to respond to a request to store data at any given time.

SUMMARY OF THE INVENTION

A method, apparatus and system for storing data wherein pieces of data are selectively combined when a request to store data is pending, and at least two pieces of data have been received since the request was made, and those at least two pieces of data can be combined into at least one combined piece of data configured to fit within the organization of storage locations within the storage device.

BRIEF DESCRIPTION OF THE DRAWINGS

The objects, features, and advantages of the present invention will be apparent to one skilled in the art in view of the following detailed description in which.

DETAILED DESCRIPTION

In the following description, for purposes of explanation, numerous details are set forth in order to provide a thorough understanding of the present invention. However, it will be apparent to one skilled in the art that these specific details are not required in order to practice the present invention. In other instances, well known electrical structures and circuits are shown in block diagram form in order not to obscure the present invention unnecessarily.

The present invention is described in the context of captured video and associated text data being stored in a dynamic RAM storage device. However, the present invention is applicable to a variety of types of data which may be received at varying times and in varying sizes from any of a number of sources. The present invention is also applicable to a variety of storage devices possessing organizational parameters such that it is possible to realize reductions in latencies by organizing data into blocks of a size and with an intended destination within that storage device that causes the storage of that data to be accomplished more efficiently. For RAM storage devices, the parameters may be the width of rows and/or columns, and the interval at which page boundaries occur. For disk storage devices, the parameters may be the number of sectors per track, the number of tracks per storage surface, the number of storage surfaces and the number of read/write heads per storage surface.

Figure 1:
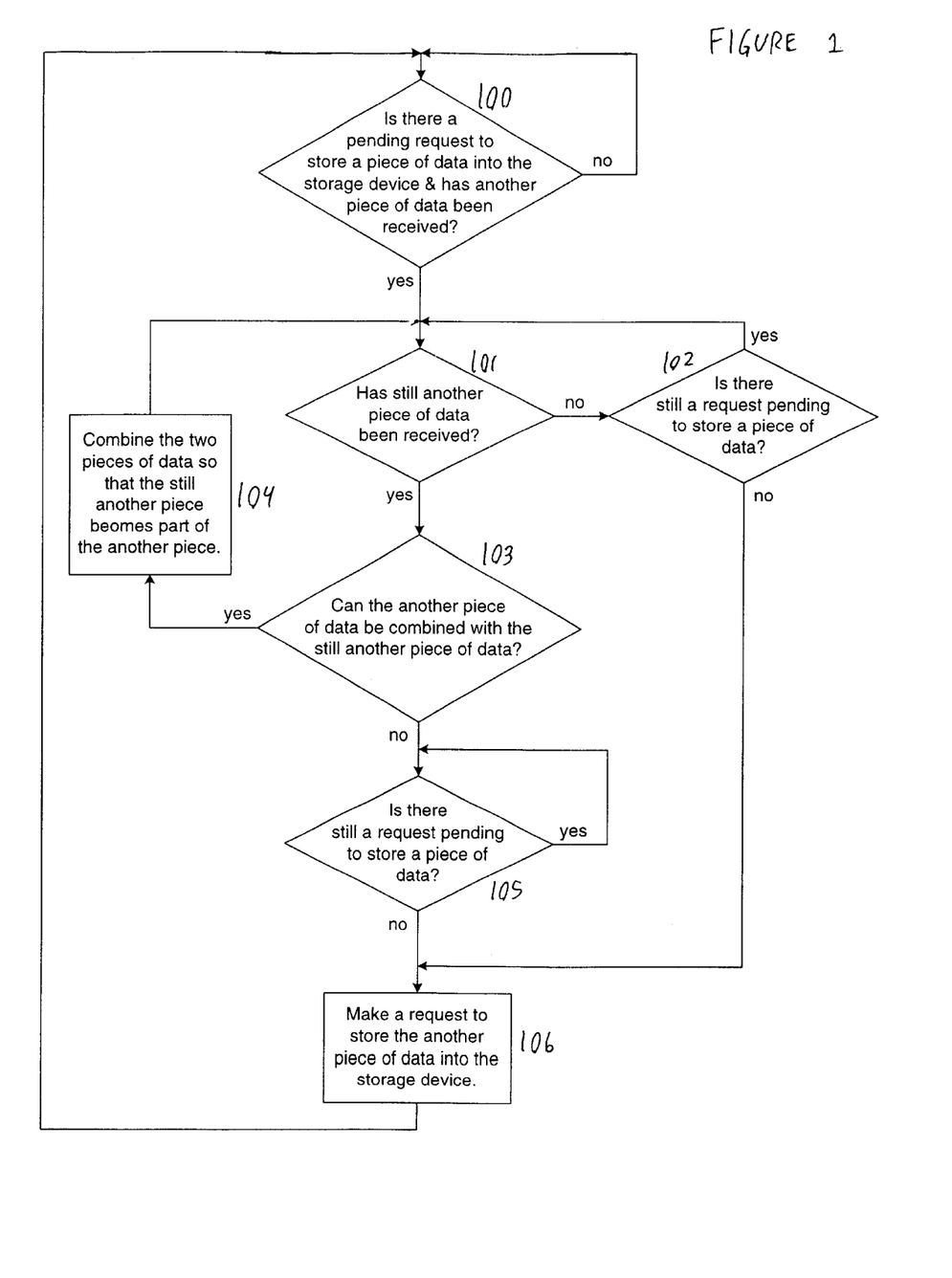
FIG. 1 is a flow chart illustrating one embodiment of the method of the present invention.

FIG. 1 is a simplified flow diagram of one embodiment of the method of the present invention. While, at step 100, pieces of sequential data are being received infrequently enough and the storage device responds quickly enough, that no request to store data remains pending long enough that a piece of sequential data is received before the storage device responds, then the answer to the query at step 100 remains no and received pieces of data are allowed to be stored in the storage device without being combined into one or more larger pieces. However, if a request store a piece of data remains pending long enough that a piece of sequential data is received before the storage device responds, then the answer to the query at step 100 becomes yes and a check is made at step 101 to determine if still another piece of data has been received.

If at step 101, still another piece of data has not been received, then at step 102, a check is made to see if the request to store the piece of data waiting to be stored into the storage device is still pending. If so, then a return is made to step 101 to again check for the receipt of still another piece of data. If at step 102, however, the request to store the piece of data waiting to be stored in the storage device is no longer pending (indicating that the waiting piece of data has now been sent to the storage device for storage), then at step 106, a request is made to store the another piece of data. A return is then made to step 100.

If at step 101, still another piece of data was received, then at step 103, a check is made to see if the still another piece of data can be combined with the another piece of data. If so, then the still another piece of data becomes part of the another piece of data, and a return is made to step 101 to again check for the receipt of still another piece of data. If at step 103, however, the still another piece of data cannot be combined with the another piece of data, then at step 105, a check is repeatedly made to see if the request to store the piece of data waiting to be stored into the storage device is still pending. When that request to store data into the storage device is no longer pending, then at step 106, a request is made to store the another piece of data, and a return is then made to step 100.

Figure 2:
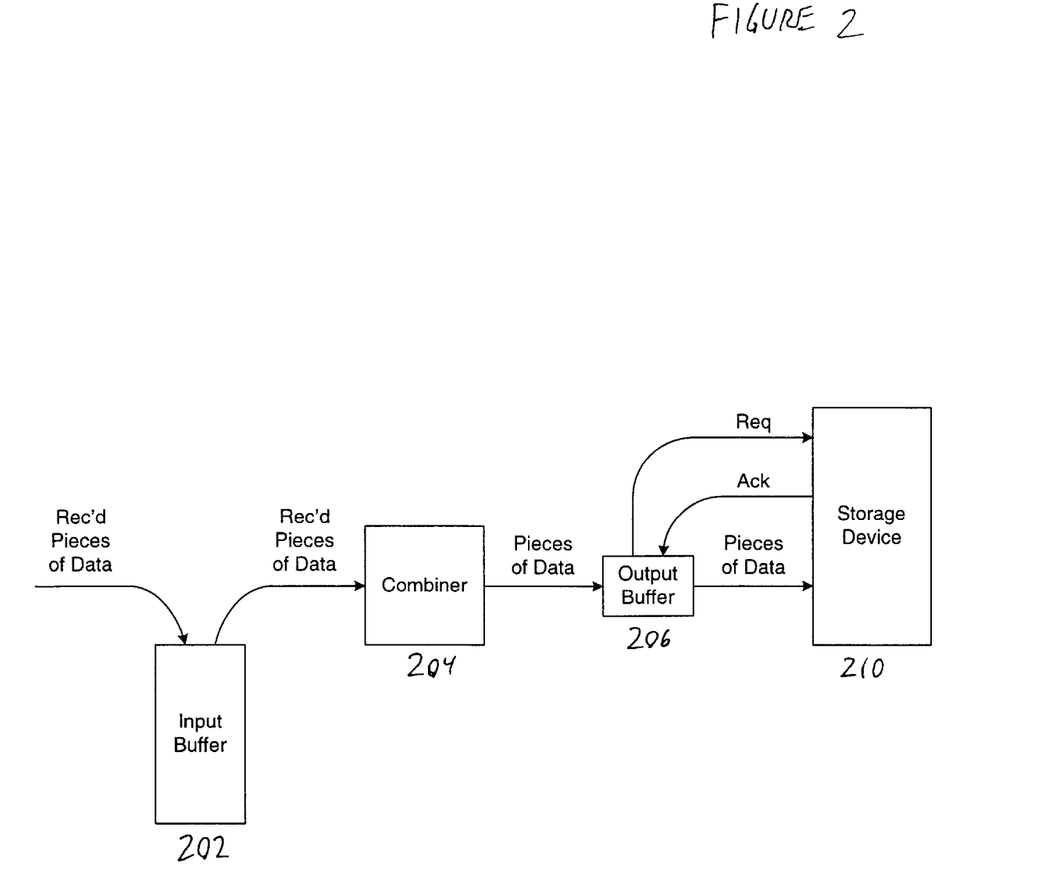
FIG. 2 is a block diagram of one embodiment of the present invention.

An embodiment of an apparatus incorporating the teachings of the present invention is depicted in FIG. 2. Received pieces of sequential data are collected in input buffer 202. Then the received pieces of data are read from buffer 202 and selectively combined into at least one combined piece of sequential data by combiner 204. The pieces of data emerging from the combiner are placed, one at a time, into output buffer 206, and with each piece of data that is placed into output buffer 206, storage device 210 is signaled with a request to store the piece of data. Output buffer 206 holds the piece data received from combiner 204 until storage device 210 answers the request with a signal indicating that storage device 210 is ready to store the piece of data, and then the piece of data is transmitted to storage device 210 for storage.

In one embodiment, a set of conditions controls the selective combining of received pieces of sequential data. When a situation arises where storage device 210 did not answer a request to store data before two or more pieces of data are collected in input buffer 202, then, starting with the piece received least recently, as many adjacent pieces of received data as possible will be read from input buffer 202 and combined by combiner 204. This combining stops when either 1) storage device 210 answers the pending request to the piece of data in output buffer 206 and there are no more received pieces of data that have not been combined; or 2) when a piece of data is received that cannot be combined with previously received pieces of data such that the resulting combined piece of data will fit optimally within the organization of storage locations within storage device 210.

In one embodiment, storage device 210 is a RAM storage device, and the combining of the two received pieces of data typically takes place if the resulting combined piece of data fits optimally within the row, column, tile and/or page boundaries of storage device 210. In another embodiment, storage device 210 is a disk storage device, and the combining of the two received pieces of data typically takes place if the resulting combined piece of data fits optimally within the sector, track, storage surface and/or read/write head organization of storage device 210. Furthermore, if the data collected in input buffer 202 belongs to more than one stream of sequential data (e.g., audio and visual data combined, or visual and text data combined), then the two received pieces of data will be combined if they belong to the same stream of sequential data.

Another set of conditions may control the flow of data among input buffer 202, combiner 204 and output buffer 206. If input buffer 202 has at least one received piece of sequential data, and combiner 204 does not currently have any data, then the least recently received piece of sequential data within input buffer 202 is read by combiner 204. If input buffer 202 has at least one received piece of sequential data, and combiner 204 also has a piece of data, and these two pieces of data can be combined, then the least recently received piece of sequential data within input buffer 202 is read by combiner 204. If either 1) both input buffer 202 and output buffer 206 have no data, but combiner 204 has a piece of data; or 2) input buffer 202 has at least one piece of received data, and combiner 204 also has a piece of data, and these two pieces of data cannot be combined, and output buffer 206 has no data; then the data currently in combiner 204 is written to output buffer 206 for storage into storage device 210.

Figure 3:
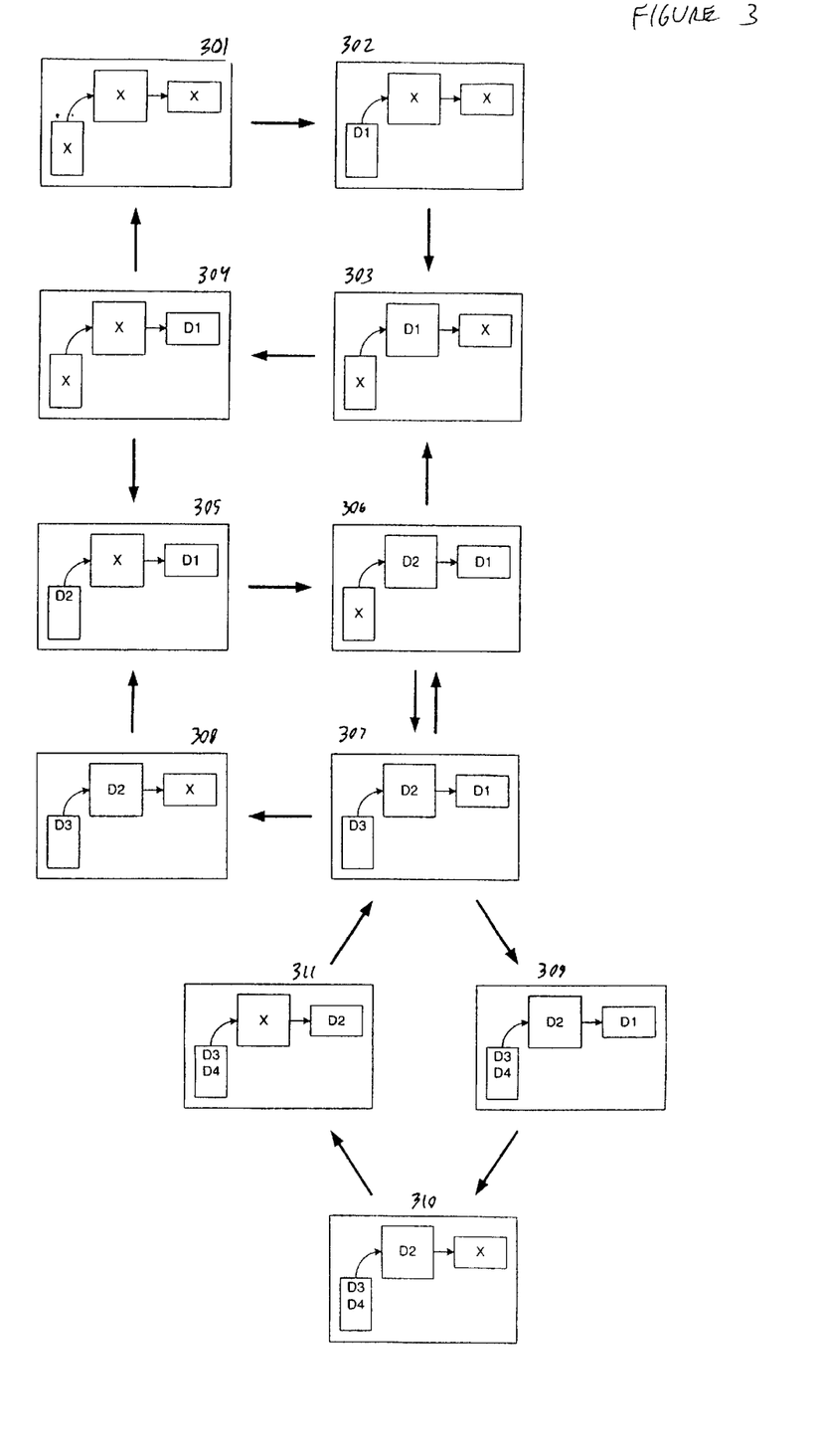
FIG. 3 is a state diagram of one embodiment of the present invention.

FIG. 3 shows the possible states of an embodiment of an apparatus incorporating the teachings of the present invention as depicted in FIG. 2. Each state depicted in FIG. 3 is a diagram that corresponds generally to the arrangement of input buffer 202, combiner 204 and output buffer 206 depicted in FIG. 2. Starting at state 301, input buffer 202, combiner 204 and output buffer 206 all have no data. At state 302, a received piece of sequential data D1 is collected in input buffer 202. Since combiner 204 is empty, piece of data D1 is read by combiner 204 at state 303. At 304, with no data in either input buffer 202 or output buffer 206, piece of data D1 is placed into output buffer 206 and a request to store data is made to the storage device into which piece of data D1 is to be stored. If the storage device answers the request to store piece of data D1 before another piece of sequential data is received, then a return would be made to state 301. However, the storage device may not answer the request to store piece of data D1 before another sequential piece of data D2 is received, as shown at state 305.

At state 306, piece of data D2 is read by combiner 204, since combiner 204 was empty. If the storage device answers the request to store piece of data D1 before still another piece of sequential data is received, then a return would be made to state 303 with piece of data D2 corresponding to piece of data D1 in state 303. However, the storage device may not answer the request to store piece of data D1 before still another piece of sequential data D3 is received at state 307.

At state 307, if pieces of data D3 and D2 can be combined, then pieces of data D3 and D2 are combined, and a return is made to state 306 with the combined piece of data corresponding to piece of data D2 depicted in state 306. However, it may be that pieces of data D3 and D2 cannot be combined, but the storage device does answer the request to store piece of data D1 before yet another piece of sequential data is received, as shown at state 308. Alternatively, it may be that pieces of data D3 and D2 cannot be combined, and the storage device does not answer the request to store piece of data D1 before yet another piece of sequential data D4 is received at state 309.

At state 309, since pieces of data D3 and D2 cannot be combined, it is necessary to wait until the storage device answers the request to store piece of data D1. During this time, however, further pieces of data (not shown) may continue to be received and collected in input buffer 202. At state 310, the storage device answers the request to store piece of data D1. Since pieces of data D3 and D2 cannot be combined and output buffer 206 is empty, piece of data D2 is placed in output buffer 206 and a request to store data is made to the storage device in which piece of data D2 is to be stored. Since combiner 204 is empty, piece of data D3 is read by combiner 204, and a return is made to state 307 with pieces of data D4, D3 and D2 corresponding to pieces of data D3, D2 and D1, respectively, in state 307.

Figure 4:
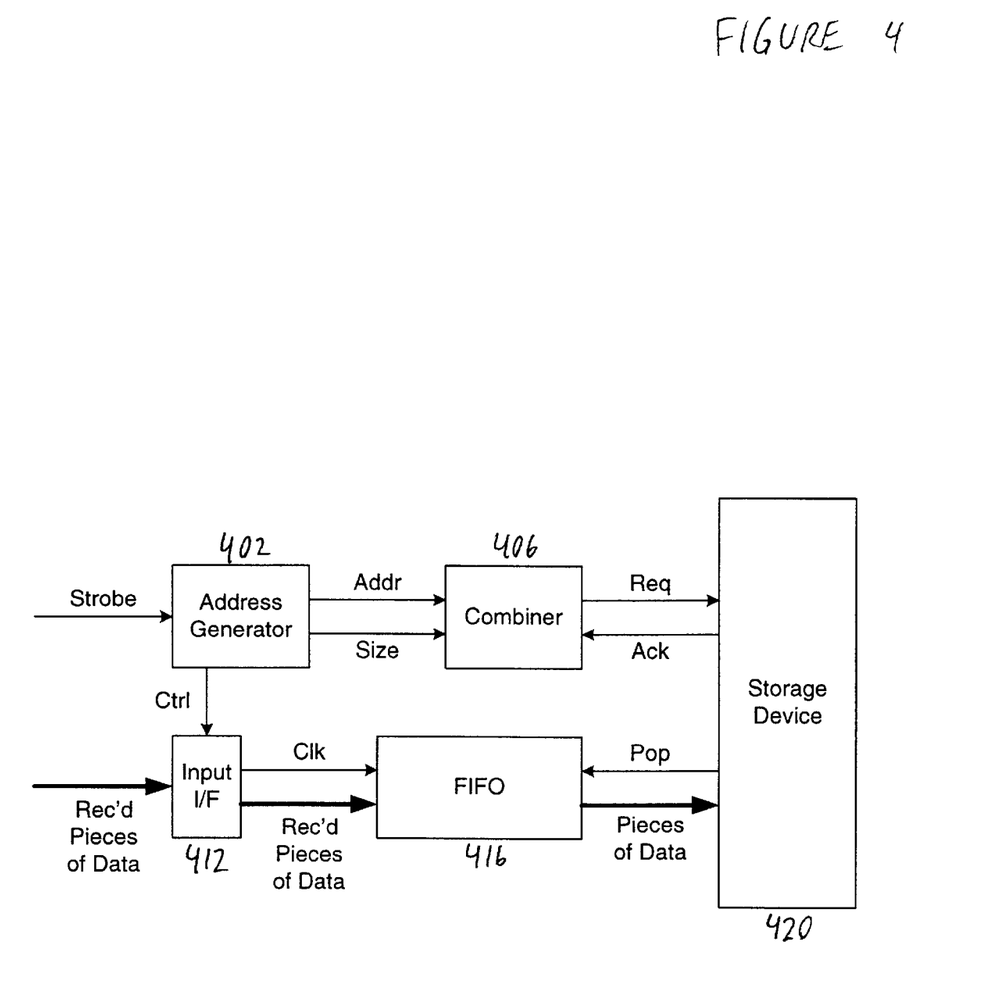
FIG. 4 is a block diagram of another embodiment of the present invention.

Another embodiment of an apparatus incorporating the teachings of the present invention is depicted in FIG. 4. Pieces of sequential data are received by input interface 412, working in conjunction with address generator 402. Input interface 412 clocks the received pieces of data into FIFO 416, a storage device that collects and provides data in accordance with a first-in-first-out algorithm familiar to those skilled in the art. Address generator 402 receives strobe signals indicating the arrival of and size of each received piece of data, and generates address and size information to be used by combiner 406 in selectively combining received pieces of data into at least one combined piece of data. At various times, combiner 406 signals storage device 420 with a request to store either a received piece of data that has not been combined with other pieces of data, or a combined piece of data created by combining two or more received pieces of data. Storage device 420 answers requests to store data by acknowledging being able to receive a piece of data, and by signaling FIFO 416 to pop (i.e., provide) the piece of data for which a request to store was made.

The work of selectively combining received pieces of sequential data is carried out by combiner 406 by manipulating the address and size information received from address generator 402. Address generator 402 provides address and size information for each received piece of sequential data, the address corresponding to the location at which the received piece of data is to be stored in storage device 420. If pieces of data are to be combined, combiner 406 sums the sizes of the pieces of data to be combined into one size, and discards all address information for the pieces of data to be combined except for the address that corresponds to where the combined piece of will be stored in storage device 420. The address and size information is communicated by combiner 406 to storage device 420 when a request to store a piece of data is made, regardless of whether the piece of data is a received piece of data that has not been combined with any other piece of data, or a combined piece of data made up of two or more received pieces of data.

In one embodiment, a set of conditions controls the selective combining of received pieces of sequential data. When a situation arises where storage device 420 did not answer a request to store data before two or more pieces of data are collected in FIFO 416, then, starting with the piece received least recently, as many adjacent pieces of received data as possible will be combined by combiner 406. This combining stops when either 1) storage device 420 answers the pending request to store data and there are no more received pieces of data that have not been combined; or 2) when a piece of data is received that cannot be combined with previously received pieces of data such that the resulting combined piece of data will fit optimally within the organization of storage locations within storage device 420.

In one embodiment, storage device 420 is a RAM storage device, and the combining of the two received pieces of data takes place if the resulting combined piece of data fits optimally within storage device 420, based on the row, column, tile and/or page boundaries of storage device 420. In another embodiment, storage device 420 is a disk storage device, and the combining of the two received pieces of data takes place if the resulting combined piece of data fits optimally within the sector, track, storage surface and/or read/write head organization of storage device 420. Furthermore, if the data collected in FIFO 416 belongs to more than one stream of sequential data (e.g., audio and visual data combined, or visual and text data combined), then the two received pieces of data will be combined if they belong to the same stream of sequential data.

Still another set of conditions controls the making of requests to store data to storage device 420. If FIFO 416 has only one piece of data (regardless of whether it is a received piece of data that has not been combined with another piece of data or a combined piece of data made up of two or more received pieces of data) and a request to store that piece of data in storage device 420 has not already been made, then the request to store that piece of data will be made. If FIFO 416 has two or more pieces of data (regardless of whether they are received pieces of data that have not been combined with other pieces of data or they are combined pieces of data made up of two or more received pieces of data), and none of the data is waiting to be stored in storage device 420 in answer to a pending request to store data, and the two pieces of data made up of the least recently received and next-to-least recently data cannot be combined, then a request will be made to store the least recently received piece of data.

Figure 5:
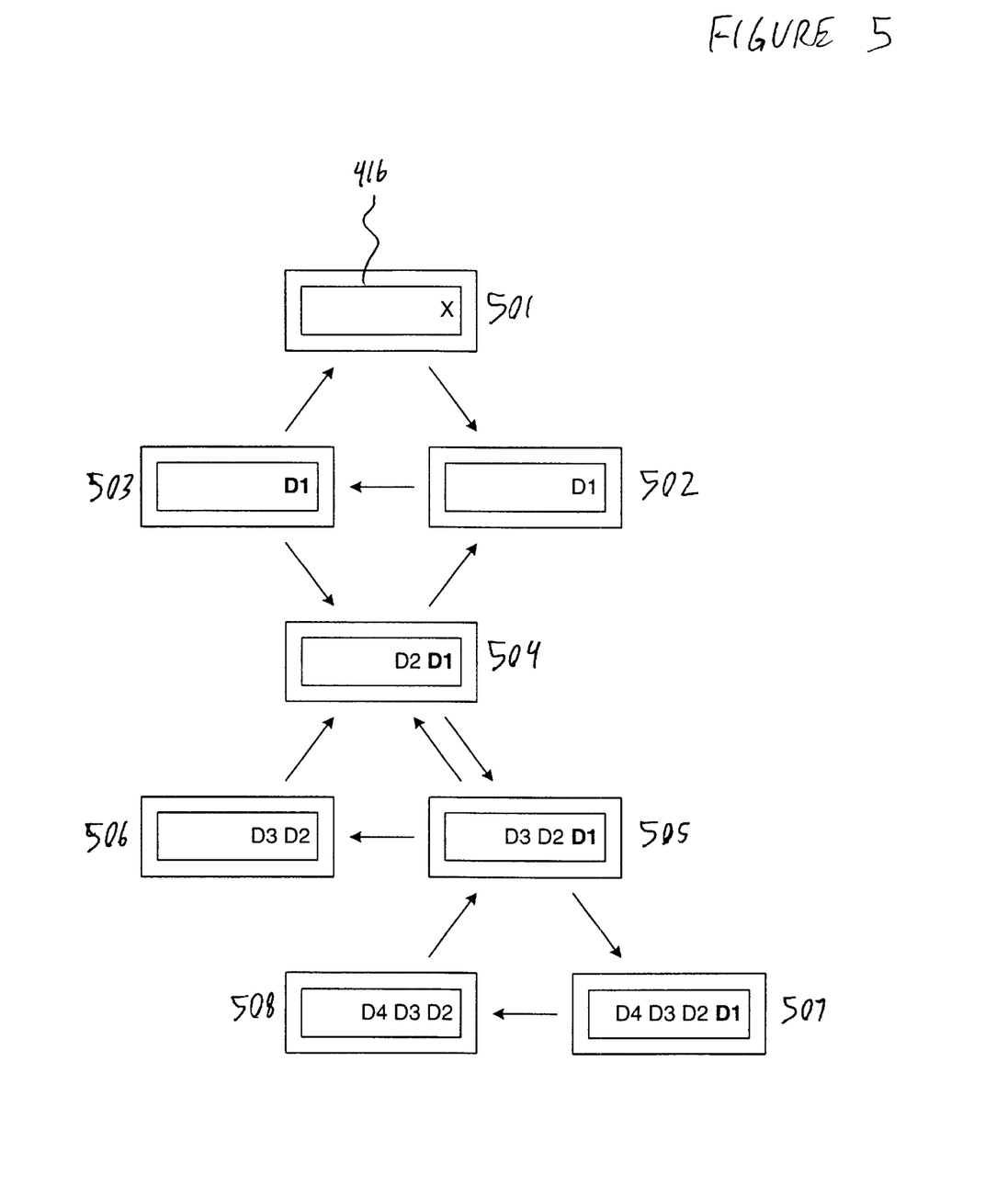
FIG. 5 is a state diagram of another embodiment of the present invention.

FIG. 5 shows the possible states of an embodiment of an apparatus incorporating the teachings of the present invention as depicted in FIG. 4. Each state depicted in FIG. 5 is a diagram that corresponds to FIFO 416 in FIG. 4, and depicts the queuing of pieces of data therein.

Starting at state 501, FIFO 416 is empty. At state 502, a piece of sequential data D1 is received and is collected by FIFO 416. At state 503, the storage device is signaled with a request to store piece of data D1 (indicated by the highlighting of the letters "D1" in the at state 503), since piece of data D1 is the only piece of data in FIFO 416 and there is no currently pending request to store a piece of data. If the storage device answers the request to store piece of data D1 before another piece of data is received, then a return is made to state 501. However, the storage device may not answer the request to store piece of data D1 before another piece of sequential data D2 is received, as shown at state 504.

At state 504, if the storage device answers the request to store piece of data D1 before another piece of data is received, then a return is made to state 502 with piece of data D2 corresponding to piece of data D1 in state 502. However, the storage device may not answer the request to store piece of data D1 before still another piece of data D3 is received, as shown at state 505.

At state 505, if pieces of data D3 and D2 can be combined, then pieces of data D3 and D2 are combined, and a return is made to state 504 with the combined piece of data corresponding to piece of data D2 depicted in state 504. However, it may be that pieces of data D3 and D2 cannot be combined, but the storage device does answer the request to store piece of data D1 before yet another piece of sequential data is received, as shown at state 506. Alternatively, it may be that pieces of data D3 and D2 cannot be combined, and the storage device does not answer the request to store piece of data D1 before yet another piece of sequential data D4 is received at state 507.

At state 507, since pieces of data D3 and D2 cannot be combined, it is necessary to wait until the storage device answers the request to store piece of data D1. During this time, however, further pieces of data (not shown) may continue to be received and collected in FIFO 416. At state 508, the storage device answers the request to store piece of data D1. Since pieces of data D3 and D2 cannot be combined and there is no currently pending request to store a piece of data, the storage device is signaled with a request to store piece of data D2, and a return is made to state 505 with pieces of data D4, D3 and D2 corresponding to pieces of data D3, D2 and D1, respectively, in state 505.

Figure 6:
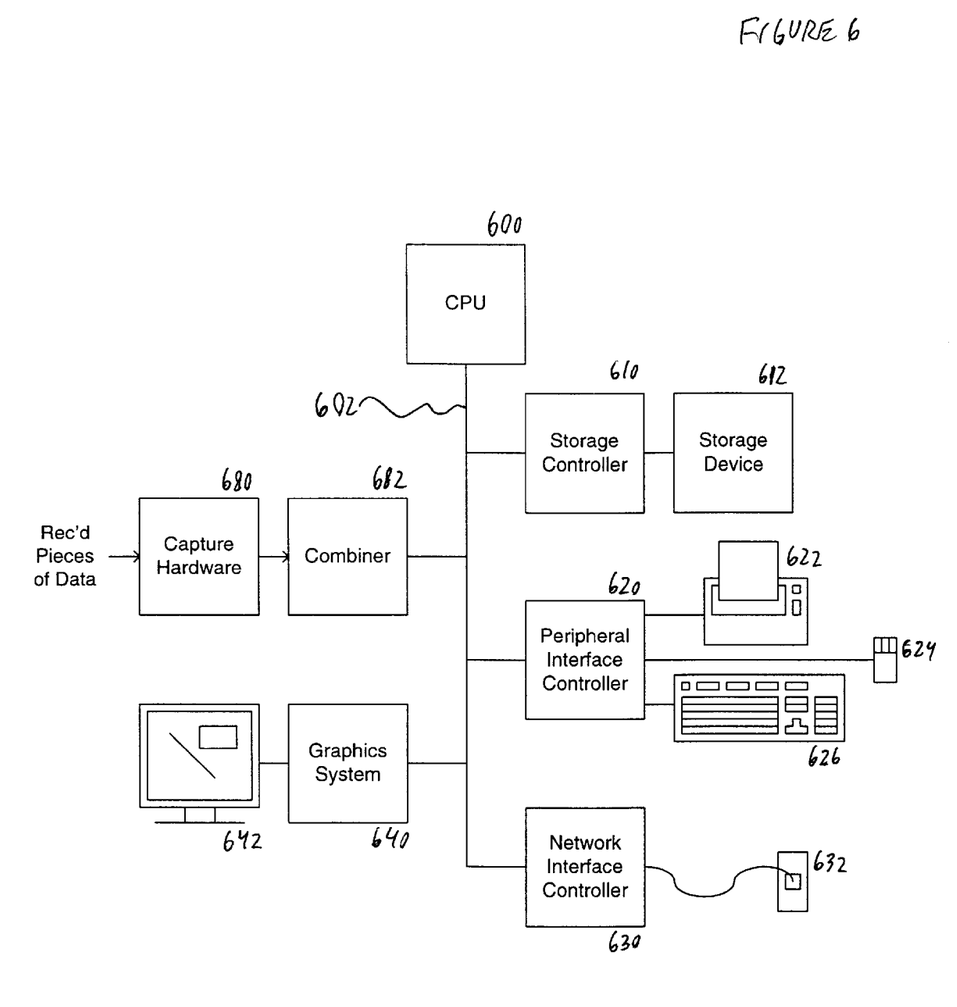
FIG. 6 is a block diagram of one embodiment of a computer system incorporating the teachings of the present invention.

An embodiment of a computer system incorporating the teachings of the present invention is depicted in FIG. 6, and includes a CPU 600, a storage controller 610 coupled to storage device 612, a peripheral interface controller 620 coupled to peripherals 622, 624 and 626, a network interface controller 630 coupled to a network 632, and a graphics system 640 coupled to a display 642. Also included is capture hardware 680 and combiner 682. Capture hardware 680 receives sequential data and relays it to combiner 682, which takes the received pieces of sequential data from capture hardware 680 and selectively combines those received pieces of data into combined pieces of data, using the teachings of the present invention. Combiner 682 also signals storage controller 610, via bus 602, to request to store pieces of data (either received pieces of data that have not been combined with any other piece of data, or combined pieces of data made up of two or more received pieces of data) in storage device 612. When storage controller 610 answers the request by signaling that storage device 612 is able to store data, combiner 682 and storage controller 610 cooperate to transfer the piece of data for which the request was made to storage device 610 for storage. In one embodiment, storage device 612 could be the main RAM of the computer system, while in another embodiment, storage device 612 could be a disk drive.

Figure 7:
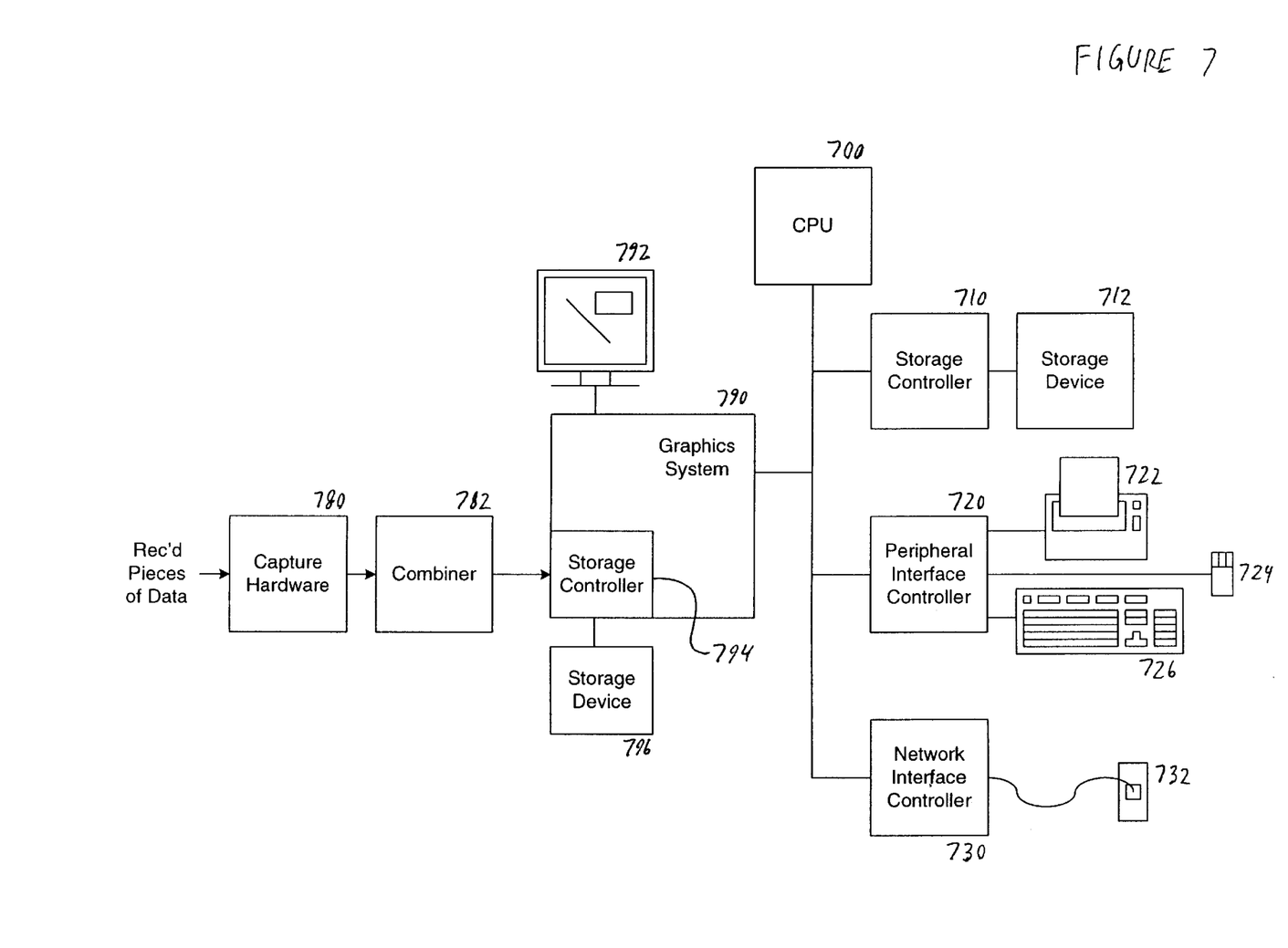
FIG. 7 is a block diagram of another embodiment of a computer system incorporating the teachings of the present invention.

An alternative embodiment of a computer system is shown in FIG. 7. Referring to FIG. 7 the system includes a CPU 700; a storage controller 710 coupled to storage device 712; a peripheral interface controller 720 coupled to peripherals 722, 724 and 726; a network interface controller 730 coupled to a network 732; and a graphics system 790 coupled to a display 792. The graphics system of this computer system also includes capture hardware 780, combiner 782, a storage controller 794 and a storage device 796. Capture hardware 780 receives sequential data and relays it to combiner 782, which take the received pieces of sequential data from capture hardware 780 and selectively combines those received pieces of data into combined pieces of data, using the teachings of the present invention. Combiner 782 also signals storage controller 794 with requests to store pieces of data (either received pieces of data that have not been combined with any other piece of data, or combined pieces of data made up of two or more received pieces of data) in storage device 796. When storage controller 794 answers the request by signaling that storage device 796 is able to store data, combiner 782 and storage controller 794 cooperate to transfer the piece of data for which the request was made to storage device 796 for storage.

In one embodiment, the received pieces of sequential data are combined if storage device 796 is a RAM storage device and the resulting larger piece fits optimally within the row, column, tile and/or page organization of storage device 796. In another embodiment, the received pieces of sequential data are combined if storage device 796 is a disk storage device and the resulting larger piece fits optimally within the sector, track, storage surface and/or read/write head organization of storage device 796. In still another embodiment, this combining of received pieces of sequential data may be limited to data received during the transmission of a single field or frame of video data, if the pieces of sequential data being received are related to video data.

The invention has been described in conjunction with the preferred embodiment. It is evident that numerous alternatives, modifications, variations and uses will be apparent to those skilled in the art in light of the foregoing description.

What is claimed is:

1. A method for storing data comprising:
   receiving at least two pieces of data; and
   selectively combining said at least two pieces of data if said at least two pieces of data can be combined into at least one combined piece of data configured to fit within the organization of storage locations within a storage device, and if there is a pending request to store one of the two pieces of data earlier received and the storage device has not answered said pending request with an indication that the storage device is ready to accept the earlier received data for storage.

2. The method of claim 1 further comprising continuing selectively combining received pieces of data into said at least one combined piece of data until either: 1) the storage device has answered said pending request with an indication that the storage device is ready to accept the earlier received data for storage, and pieces of data received since said pending request was made have been combined into said at least one combined piece of data; or 2) when a received piece of data is encountered that cannot be combined into said at least one combined piece of data such that said at least one combined piece of data will be configured to fit within the organization of storage locations within the storage device.

3. The method of claim 1 wherein the received pieces of data comprise at least two streams of data wherein each stream carries information to be stored at differing locations within said storage device.

4. The method of claim 3 wherein said selectively combining is performed if two successive received pieces of data are from the same stream of data.

5. The method of claim 4 wherein:
   at least one stream of data of the at least two streams of data comprises video data and at least one other stream of the at least two streams of data comprises text data related to the at least one stream of video data; and
   said selectively combining is performed if two successive received pieces of data are from the at least one stream of text data, and are related to the same fields or frames of video data from within the at least one stream of video data.

6. The method of claim 1 wherein the data received is selected from the group consisting of audio data, video data and text data.

7. The method of claim 1 wherein said storage device is selected from the group consisting of a RAM storage device and a disk storage device.

8. An apparatus for minimizing data loss, comprising:
input means configured to receive at least two pieces of data; and
combining means configured to combine said at least two pieces of data if the at least two pieces of data can be combined into at least one combined piece of data configured to fit within the organization of storage locations within a storage device, and if there is a pending request to store one of the two pieces of data earlier received and the storage device has not answered said pending request with an indication that the storage device is ready to accept the earlier received data for storage.

9. The apparatus of claim 8 wherein said combining means is further configured to continue selectively combining received pieces of data into said at least one combined piece of data until either: 1) said storage device has answered said pending request with an indication that the storage device is ready to accept the earlier received data for storage, and pieces of data received since said pending request was made have been combined into a combined piece of data; or 2) when a received piece of data is encountered that cannot be combined into said at least one combined piece of data such that said at least one combined piece of data will be configured to fit within the organization of storage locations within said storage device.

10. The apparatus of claim 8 wherein the received pieces of data comprise at least two streams of data wherein each stream carries information to be stored at differing locations within said storage device.

11. The apparatus of claim 10 wherein said combining means is configured to perform selectively combining if two successive received pieces of data are from the same stream of data.

12. An apparatus for minimizing data loss, comprising:
a buffer configured to receive at least two pieces of data; and
a combiner configured to combine said at least two pieces of data if the at least two pieces of data can be combined into at least one combined piece of data configured to fit within the organization of storage locations within a storage device, and if there is a pending request to store one of the two pieces of data earlier received and the storage device has not answered said pending request with an indication that the storage device is ready to accept the earlier received data for storage.

13. The apparatus of claim 12 wherein said combiner is further configured to continue selectively combining received pieces of data into said at least one combined piece of data until either: 1) said storage device has answered said pending request with an indication that the storage device is ready to accept the earlier received data for storage, and pieces of data received since said pending request was made have been combined into a combined piece of data; or 2) when a received piece of data is encountered that cannot be combined into said at least one combined piece of data such that said at least one combined piece of data will be configured to fit within the organization of storage locations within said storage device.

14. The apparatus of claim 12 wherein the received pieces of data comprise at least two streams of data wherein each stream carries information to be stored at differing locations within said storage device.

15. The apparatus of claim 14 wherein said combiner is configured to perform selectively combining if two successive received pieces of data are from the same stream of data.

16. A computer system, comprising:
at least one CPU;
at least one storage device configured to accessible by the at least one CPU; and
a combiner coupled to the at least one storage device and configured to receive at least two pieces of data and to selectively combine the at least two pieces of data if the at least two pieces of data can be combined into at least one combined piece of data configured to fit within the organization of storage locations within said at least one storage device, and if there is a pending request to store one of the two pieces of data earlier received and the storage device has not answered said pending request with an indication that the storage device is ready to accept the earlier received data for storage.

17. The computer system of claim 16 wherein said combiner is further configured to continue selectively combining received pieces of data into said at least one combined piece of data until either: 1) said at least one storage device has answered said pending request with an indication that said at least one storage device is ready to accept the earlier received data for storage, and pieces of data received since said pending request was made have been combined into a combined piece of data; or 2) when a received piece of data is encountered that cannot be combined into said at least one combined piece of data such that said at least one combined piece of data will be configured to fit within the organization of storage locations within said at least one storage device.

18. The computer system of claim 16 wherein the received pieces of data comprise at least two streams of data wherein each stream carries information to be stored at differing locations within said at least one storage device.

19. The computer system of claim 18 wherein said combiner is configured to perform selectively combining if two successive received pieces of data are from the same stream of data.

20. The computer system of claim 19 wherein:
at least one stream of data of the at least two streams of data comprises video data and at least one other stream of the at least two streams of data comprises text data related to the at least one stream of video data; and
said selectively combining is performed if two successive received pieces of data are from the at least one stream of text data, and are related to the same fields or frames of video data from within the at least one stream of video data.

21. The computer system of claim 16 wherein the data received is selected from the group consisting of audio data, video data or text data.

22. A graphics system, comprising:
at least one graphics controller configured to provide an image on a display;
at least one storage device configured to be accessible by the at least one graphics controller;
capture hardware for capturing at least one stream of data;
a combiner coupled to the at least one storage device and configured to receive at least two pieces of data and to selectively combine said at least two pieces of data if the at least two pieces of data can be combined into at least one combined piece of data configured to fit within the organization of storage locations within said at least one storage device, and if there is a pending request to store one of the two pieces of data earlier received and the storage device has not answered said pending request with an indication that the storage device is ready to accept the earlier received data for storage.

23. The graphics system of claim 22 wherein said combiner is further configured to continue selectively combining received pieces of data into said at least one combined piece of data until either: 1) said at least one storage device has answered said pending request with an indication that said at least one storage device is ready to accept the earlier received data for storage, and pieces of data received since said pending request was made have been combined into a combined piece of data; or 2) when a received piece of data is encountered that cannot be combined into said at least one combined piece of data such that said at least one combined piece of data will be configured to fit within the organization of storage locations within said at least one storage device.

24. The graphics system of claim 22 wherein the received pieces of data comprise at least two streams of data wherein each stream carries information to be stored at differing locations within said at least one storage device.

25. The graphics system of claim 22 wherein said storage device is selected from the group consisting of a RAM storage device and a disk storage device.

26. A computer readable medium comprising instructions, which when executed by a processor, receives at least two pieces of data, and selectively combines said at least two pieces of data if said at least two pieces of data can be combined into at least one combined piece of data configured to fit within the organization of storage locations within said at least one storage device, and if there is a pending request to store one of the two pieces of data earlier received and the storage device has not answered said pending request with an indication that the storage device is ready to accept the earlier received data for storage.

27. The computer readable medium of claim 26 wherein said selectively combining of received pieces of data into said at least one combined piece of data continues until either: 1) said at least one storage device has answered said request with an indication that the storage device is ready to accept the earlier received data for storage, and all pieces of data received since said request was made have been combined into said at least one combined piece of data; or 2) when a received piece of data is encountered that cannot be combined into said at least one combined piece of data such that said at least one combined piece of data will be configured to fit within the organization of storage locations within said at least one storage device.

* * * * *